United States Patent [19]

Fink

[11] Patent Number: 5,172,387
[45] Date of Patent: Dec. 15, 1992

[54] SINGLE SPECTRAL LINE LASER

[75] Inventor: David Fink, Los Angeles, Calif.

[73] Assignee: Hughes Aircraft Company, Los Angeles, Calif.

[21] Appl. No.: 706,471

[22] Filed: May 28, 1991

[51] Int. Cl.$^5$ .............................................. H01S 3/14
[52] U.S. Cl. ...................................................... 372/68
[58] Field of Search ......................................... 372/68

[56] References Cited

U.S. PATENT DOCUMENTS

| | | | |
|---|---|---|---|
| 4,241,319 | 12/1980 | Papayoanou | 372/68 |
| 4,644,555 | 2/1987 | Amano | 372/68 |
| 4,672,617 | 6/1987 | Hansen | 372/68 |
| 4,697,271 | 9/1987 | Amano | 372/68 |
| 4,860,301 | 8/1989 | Nicholson | 372/68 |
| 4,910,746 | 3/1990 | Nicholson | 372/68 |
| 4,942,586 | 7/1990 | Lai | 372/68 |

*Primary Examiner*—John D. Lee
*Assistant Examiner*—Robert E. Wise
*Attorney, Agent, or Firm*—W. J. Streeter; W. K. Denson-Low

[57] ABSTRACT

This invention forces a multi-spectral line laser to operate on a single spectral line by modifying the gain of the medium instead of the standard approach of modifying the loss of the cavity. The spectral line selected by the system of the present invention is always the same identical spectral line. There are no ambiguities in knowing which line has been selected as there are with other methods. The invention involves a system for using more than one type of gain media within the laser cavity. Each medium gives rise to a distinct set of spectral line frequencies at which it has gain. Only occassional coincidences will occur at which spectral lines from two or more media fall within a linewidth of each other. Where these coincidences do not occur, the gain for a spectral line is only proportional to the amount of the individual medium present and will be below threshold. Where the coincidences do occur, the total gain is proportional to the total amount of gain for all of the involved media and the line will lase. Spectral lines that are within one operating linewidth of one another may be achieved by the use of two different types of gain media within the laser cavity. The most promising embodiment of the present invention is to use the same type of gain media but with different isotopes, which would, in many but not all cases, allow a physical mixing of the media within the resonant cavity. Each medium or isotope gives rise to a different and distinct set of spectral line frequencies at which the system has gain. Only occasional coincidences will occur at which spectral lines from two or more media fall within a linewidth of each other. Where these coincidences do not occur, the gain for a spectral line is only proportional to the amount of the individual medium present and will be below threshold. Where the coincidences do occur, the total gain is proportional to the total amount of all the involved media and the line will lase.

16 Claims, 1 Drawing Sheet

| | | OXYGEN | | | | | |
|---|---|---|---|---|---|---|---|
| | | 16-16 | 17-17 | 18-18 | 16-17 | 16-18 | 17-18 |
| CARBON | 12 | X | X | X | | X | |
| | 13 | X | | X | | X | |
| | 14 | X | | X | | | |

TABLE A

FIG. 1

TABLE A

| CARBON | OXYGEN | | | | |
|---|---|---|---|---|---|
| | 16-16 | 17-17 | 18-18 | 16-17 | 16-18 | 17-18 |
| 12 | x | x | x | | | |
| 13 | x | | x | | x | |
| 14 | x | | x | | x | |

FIG. 2

| DIFFERENCE (MHz) | LOWER LINE | | | UPPER LINE | | |
|---|---|---|---|---|---|---|
| | MOLECULE | BAND TRANS | FREQUENCY (MHz) | MOLECULE | BAND TRANS | FREQUENCY (MHz) |
| 3.49 | 16O 12C 18O | I P(13) | 28665701.12 | 16O 12C 16O | I P(6) | 28665704.61 |
| 9.87 | 16O 13C 18O | I R(32) | 28330279.31 | 18O 12C 18O | I P(28) | 28330289.18 |
| 24.05 | 18O 13C 18O | I R(24) | 28303527.03 | 16O 12C 18O | I P(27) | 28303551.08 |
| 50.66 | 16O 12C 18O | I P(12) | 29237610.41 | 17O 12C 17O | I R(13) | 29237661.07 |
| 59.38 | 16O 13C 16O | I R(34) | 28108073.29 | 16O 12C 18O | I P(34) | 28108132.67 |
| 68.49 | 16O 12C 16O | I R(14) | 29137736.12 | 16O 12C 18O | I R(7) | 29137804.61 |
| 80.09 | 16O 13C 16O | II P(16) | 30107553.10 | 16O 13C 18O | II P(21) | 30107633.19 |
| 83.63 | 17O 12C 17O | I R(12) | 29218347.06 | 16O 12C 16O | I R(18) | 29218430.69 |
| 105.85 | 16O 12C 18O | I R(34) | 29618206.65 | 18O 12C 18O | I R(36) | 29618312.51 |
| 134.07 | 16O 13C 18O | I R(31) | 28313526.94 | 17O 12C 17O | I P(26) | 28313661.01 |
| 144.19 | 16O 12C 18O | I R(9) | 29178311.49 | 16O 12C 16O | I R(16) | 29178455.68 |
| 206.94 | 17O 12C 17O | I R(14) | 29256779.22 | 16O 12C 18O | I R(13) | 29256986.16 |
| 233.24 | 16O 14C 16O | II P(32) | 28598438.33 | 17O 12C 17O | I P(15) | 28598671.57 |
| 243.16 | 16O 12C 18O | II R(11) | 32409942.54 | 16O 12C 16O | II R(24) | 32410185.70 |
| 248.63 | 16O 12C 18O | I P(15) | 28616293.14 | 16O 12C 16O | I P(8) | 28616541.77 |
| 252.00 | 16O 13C 16O | II P(24) | 29886344.51 | 18O 14C 18O | II R(22) | 29886596.51 |
| 296.95 | 16O 12C 18O | I P(33) | 28136639.84 | 16O 13C 18O | I R(21) | 28136936.79 |

SINGLE SPECTRAL LINE LASER

BACKGROUND OF THE INVENTION

1. Field of the Invention

The invention relates generally to a single spectral line laser and more particularly to a system for forcing a multi-spectral line laser to operate on a single spectral line.

2. Description of the Prior Art

The prior art has attempted to force a laser to operate on a single spectral line by making the loss of the cavity extremely sensitive to the optical frequency by use of a diffraction grating, prism, absorption cell, filter, selective coating, or birefringent material. Such prior art attempts all add additional loss to the undesired frequencies and are difficult to make selective enough to discriminate between closely-spaced spectral lines. Most of the systems of the prior art are easily damaged, are relatively expensive, are alignment sensitive, are significantly to the cavity length, and have temperature dependent passbands. Also, most such systems cannot readily discriminate between closely-spaced spectral lines.

As a specific prior art example, for an infrared carbon dioxide laser, a infraction grating has been the only practical method of selecting spectral lines, but it adds a four percent loss to the cavity for the selected line; does not totally reject adjacent lines in many of its implementations; is easily damaged; is expensive; and will change spectral lines with alignment and with only a few degrees change in temperature, as the thermal expansion of the diffraction grating substrate changes the spacing of the diffraction grooves.

BRIEF SUMMARY OF THE INVENTION

The present invention forces a multi-spectral line laser to operate on a single spectral line by modifying the gain of the media instead of the standard or prior art approach of modifying the loss of the cavity. The present invention solves substantially all of the problems of the prior art while encountering few if any of its disadvantages. The advantages of the present invention include the fact that there are no diffraction gratings, prisms, absorption cells, filters, selective coatings, or birefringent materials needed for use in the cavity. All of the prior art methods add significant loss to the desired frequency and are difficult to make selective enough to discriminate between the closely-spaced spectral lines.

The present invention adds no loss to the desired frequency, is perfectly selective to a single spectral line, cannot be damaged, is inexpensive, needs no alignment, and is temperature independent. In some cases, the system of the present invention may require some additional gain length to compensate for a reduced gain, but a reduced gain is better than an equal amount of increased loss because gain saturates with increasing flux levels, while loss does not.

In the present system, the spectral line selected is always the same one. There is no uncertainty in knowing which line has been selected as there is with the prior art methods. The invention involves a system using more than one gain media within the laser cavity. Each medium gives rise to a distinct set of spectral line frequencies at which it has gain. Only occasional coincidences will occur at which spectral lines from two or more media fall within a linewidth of each other. Where these coincidences do not occur, the gain for a spectral line is only proportional to the amount of the individual medium present and will be below threshold. Where the coincidences do occur, the total gain is proportional to the total amount of gain for all of the involved media and the line will lase.

In the preferred embodiment of the present invention, the system utilizes the same type of gain media but with different isotopes. In many (but not all) cases, this will allow physical mixing of the media.

One application of the system of the present invention can be with lasers that are required to operate on a single spectral line, which they currently can do only with great manufacturing difficulty, and even then, not too reliably. The present invention will guarantee single spectral line operation even in the presence of misalignment and temperature variations. It will also greatly reduce the cost of the lasers. Furthermore, the present system or method appears applicable to many different types of lasers.

The spectral line selected is fixed, rather than being one of a number of possible lines, which is important for applications such as radar, which require knowing the absolute frequency transmitted. For instance, the velocity of a moving target is calculated from the Doppler shift by the formula $v=(\frac{1}{2})(\Delta f/f)c$, where "f" is the frequency of the light, "$\Delta f$" is the Doppler shift, and "c" is the velocity of light. Any uncertainty in "f" becomes an uncertainty in "v". For a carbon dioxide laser, the spectral lines are separated by 0.2%. A diffraction grating-selected laser might lase on P(18), P(20), or P(22), which would give an uncertainty in the velocity of about ±0.2%. The present invention will operate on one exact spectral line so that this source of error will be zero.

These and other objects and advantages of the present invention will be more fully understood after reading this detailed description of the preferred embodiments, the claims, and the drawings, which are briefly described herein below.

BRIEF DESCRIPTION OF THE DRAWINGS

In the accompanying drawings:

FIG. 1 is a table of the 18 possible $CO_2$ isotopic molecules. Measurements have been made of the absolute lasing frequencies of the nine indicated species; and FIG. 2 is a table illustrating a list of all coincidences within 300 MHz among the nine species.

DETAILED DESCRIPTION OF THE PREFERRED EMBODIMENT

The present invention multi-spectral line laser to operate on one single spectral line by modifying the gain of the medium instead of the standard approach of the prior art, which modifies the loss of the cavity. The present invention adds substantially no loss to the desired frequency; is perfectly selective to one single spectral line; cannot be damaged; is relatively inexpensive; needs no alignment; and is temperature independent. In most cases, the system of the present invention may require some additional gain length to compensate for a reduced gain, but a reduced gain is better than an equal amount of increased loss because gain saturates with increasing flux levels, while loss does not. The spectral line selected is always the same one. There are no ambiguities in knowing which line has been selected as there are with the methods of the prior art.

The present invention involves a laser system in which more than one gain medium is used within a laser cavity. Each medium gives rise to a different and distinct set of spectral line frequencies at which it has gain, and only occasional coincidences will occur at which spectral lines from one or more media fall within a linewidth of each other. Where these coincidences do not occur, the gain for the spectral line is only proportional to the amount of the individual medium present and will be below threshold. Where the coincidences do occur, the total gain is proportional to the total amount of gain for all involved media and the line will lase. In the most promising embodiment of the present invention, the same type of gain media will be used but with different isotopes. In many (but not all) cases, this will allow physically mixing of the media.

The present method and apparatus finds use in many types of lasers used in the commercial market, the military market, and in general electro-optical systems. Many of these lasers are required to operate on a single spectral line, which they presently can do only with great manufacturing difficulty and even then, not too reliably. The present system guarantees a single spectral-line operation even in the presence of misalignments and temperature variations. Furthermore, the use of the method or apparatus of the present invention substantially reduces the cost of the lasers. The present invention is applicable to many different types of lasers.

In the present system, the spectral line selected is fixed, rather than being one of a number of possible lines, as in the prior art. This is important for many applications such as radar for example, that require knowing the absolute frequency transmitted. For instance, the velocity of a moving target is calculated from the Doppler shift by the formula $v=(\frac{1}{2})(\Delta f/f)c$, where "f" is the frequency of the light, "$\Delta f$" is the Doppler shift, and "c" is the velocity of light. Any uncertainty in "f" becomes an uncertainty in "v". For a conventional carbon-dioxide laser, the spectral lines are separated by 0.2%. A diffraction grating-selected laser might lase on P(18), P(20), or P(22), which would give an uncertainty in the velocity of approximately ±2%. The present invention however, operates on one exact spectral line so that this source of error will always be zero.

The method and system of the present invention uses more than one gain media so that the system can lase only at frequencies where the spectral lines from the various media coincidentally overlap within a linewidth. Most promising are media of the same type, but with different isotopes. The existence of overlaps will depend on the type of laser, the isotopes available, and the linewidth. The coincident lines must each have a usable gain, ideally of about the same value or magnitude. If the lines have different gains, the required gain length can be minimized by using as much of the higher gain medium as possible without its lasing by itself, and then adding the lower gain media. In many types of media (those in which the upper lasing states feed off a common manifold), it is not actually necessary for the individual media to be below threshold. The coincident lines will have a much larger total gain than non-coincident lines, and therefore will be the ones to lase.

With isotopic substitution, in some cases it may be necessary to have separate gain sections for the different isotopic species so that the pumping mechanism can be tailored to the isotopic requirements or to otherwise prevent isotopic exchange.

It will be realized that the present invention relates to many different types of lasers although the remaining description will treat the infrared carbon-dioxide waveguide laser with isotopic substitution as an example of the preferred embodiment thereof.

A carbon dioxide waveguide laser is usually operated at a gas pressure of about 100 torr, where the gain linewidth is pressure-broadened to about 600 MHz full-width half-height. Consequently, we need only locate the isotopic spectral lines that fall within about 200 MHz of each other. The spacing between lines for one isotopic species is about 50 GHz. Because the carbon-dioxide molecules are subject to continuous disassociation and reassociation, if an actual mixture of isotopes is used, rather than separate gain sections, the oxygen atoms should all be of the same isotope. Otherwise, the disassociation/association phenomena will generate carbon-dioxide molecules with all -possible combinations of oxygen isotopes. If enough of these molecular types have coincident spectral lines, mixed oxygen isotopes may be used, but such coincidence is highly unlikely. Molecules with different oxygen isotopes can be used if they are put in physically separate gain sections. Also, a molecule with two different isotopes on the same molecule will reassociate into a mixture of molecules of the same and different oxygen.

Carbon 12, 13, or 14 can be used with oxygen 16, 17, or 18. These provide nine molecular types in which the two oxygens are of the same isotope, and nine more molecular types with mixed oxygen isotopes. Data is available to search for coincidences among the regular bands of nine of these eighteen possible molecules, seven with identical oxygens and two with mixed oxygens. The nine molecules are identified in the table of FIG. 1.

A search has been made for coincidences with a restriction of the J-state of the lower level of the transition between six and thirty-six so that the spectral lines would have reasonable gains. FIG. 2 sets forth a list of all coincidences within 300 MHz. This list could, of course, be lengthened as more data is available. Also, the search for coincident spectral lines within this region did not include the hotband lines and the sequence band lines, which lie in the same spectral region.

The absolute frequency data used for the table of FIG. 2 is taken from IEEE J. Quant. Elect. QE-2 (Feb. 1986) page 234 authored by L. C. Bradley, K. L. Soohoo, and C. Freed, which is specifically incorporated by reference herein.

It should be realized that in the present invention, it is not the use of isotopes that is important, but rather the use of spectral lines that are within an operating linewidth of one another. Isotopes are only a convenient implementation of the concept of the present invention. As shown in the table of FIG. 2, although convenient, the isotopes do not work too well in the carbon-dioxide laser system. The closest match at the top of the table requires one of the molecules to be a mixed oxygen molecule. When mixed oxygen molecules are put in a laser, they disassociate and reassociate to form a mixture of molecules, such as $^{16}O_{12}C^{18}O$ into about 50% $^{16}O^{12}C^{18}O$, 25% $^{16}O^{12}C^{16}O$, and 25% $^{18}O^{12}C^{18}O$. This reassociation is suitable for the 3.49 MHz difference case, because two of the three resulting molecules are involved, but P(6) is an extremely weak line, making this a poor choice. The 9.87 MHz case is reasonable, as long as two separate gain media are used so that the carbon isotopes are not exchanged to also form $^{16}O^{12}C$-

$^{16}O$ and $^{16}O^{12}C^{18}O$. The 24.05 MHz case has the strongest lines, I-R (24) and I-P (27), but it uses one mixed isotope molecule, $^{16}O^{12}C^{18}O$, which will reassociate. The 83.63 MHz case is probably the best choice when two separate gain media are used, so there will be no reassociations at all. Both I-R (12) and I-R (18) have fairly good gains, but oxygen 17 is extremely expensive.

Therefore, the present system includes a conventional laser provided with means for modifying the gain of the medium rather than modifying the loss of the cavity. The system always selects the same spectral line and there are no ambiguities in knowing which line has been selected. The system employs the use of more than one type of gain media within the laser cavity such that each medium gives rise to a distinct set of spectral line frequencies at which it has gain, and only occasional coincidences will occur where the spectral line from two or more media fall within a linewidth of one another. Where these coincidences occur, the system will lase. Furthermore, in the preferred embodiment, the same type of gain media are used but with different isotopes.

The method of the present invention involves providing more than one type of gain media within the laser cavity and lasing at one exact spectral line frequency at which the coincidence occurs.

It will be understood to those skilled in the art that various modifications, alterations, substitutions, changes and variations can be made in the method and system of the present invention without departing from the spirit and scope of the invention, which is limited only by the appended claims.

What is claimed is:

1. A method of forcing a multi-spectral line laser to operate on a single specific spectral line, comprising the steps of:
    having at least two types of gain media within the laser cavity;
    energizing said at least two types of gain media for generating at least two sets of separate spectral lines; and
    lasing at a fixed specific line where the spectral line frequencies of said at least two sets of spectral lines coincide and fall within a linewidth of one another for producing a total gain proportional to the total amount of gain of all of the involved medium.

2. A method of forcing a multi-spectral line laser to operate on a single fixed spectral line comprising the steps of:
    adding a first type of gain material and an isotope thereof to the laser cavity; and
    lasing on a single spectral line where a coincidence of two spectral lines occur between said first type of gain material and said isotope thereof where the total gain is proportional to the total amount of gain of the combined gain material.

3. A method of producing a laser beam having a precisely fixed spectral line frequency comprising the steps of:
    inserting more than one gain media into the laser cavity; and
    lasing at a single precise frequency where the spectral lines from said more than one gain media overlap within a linewidth of one another.

4. The method of claim 3 wherein said placing step further includes the steps of inserting a first gain media into the laser cavity and adding a second different and distinct gain media into the laser cavity.

5. The method of claim 3 wherein said placing step includes the steps of inserting a first gain material into the laser cavity and adding an isotope thereof to said laser cavity.

6. A laser system for lasing only at a single precise fixed spectral line frequency comprising:
    a laser having a laser cavity; and
    at least a first and second different and distinct gain medium operatively disposed within said laser cavity, said first and second gain media each producing a different and distinct set of spectral lines, at least one of the spectral lines from each gain medium coincidentally overlying the other within a linewidth for combining the total gain thereof and lasing at said precise fixed spectral line frequency.

7. The laser system of claim 6 wherein said laser includes a $CO_2$ infrared laser.

8. The laser system of claim 6 wherein said first and second different and distinct gain media include different types of gain media.

9. The system of claim 6 wherein said first and second different and distinct media include at least a first predetermined media and wherein said second gain media includes an isotope of said first gain media.

10. The system of claim 9 wherein said isotope includes isotopes of oxygen.

11. The system of claim 6 wherein said isotope includes isotopes of carbon.

12. The system of claim 6 wherein said first and second different and distinct gain media include two different and distinct non-isotopic media.

13. A laser system comprising:
    a laser cavity; and
    at least a first and second gain media operably disposed within said laser cavity, each of said gain media having its own separate and distinct spectral lines, at least one of the spectral lines of said first media coinciding with one of the spectral lines of said second media for overlying each other within a linewidth, thereby combining the total gain thereof for lasing at a precise fixed spectral line frequency.

14. A method for generating a fixed frequency laser beam comprising the steps of:
    partially filling the laser cavity with a first gain media;
    adding a second different and distinct type of gain media to the laser cavity;
    combining the gains of the two gain media whenever a spectral line of one overlaps a spectral line of the other within one linewidth; and
    lasing at a fixed spectral line frequency indicative of the point of coincidence of said spectral lines.

15. The method of claim 14 wherein said step of adding a second different and distinct type of gain media includes inserting a chemically different gain media.

16. The method of claim 14 wherein said step of adding a second different and distinct type of gain media includes the step of inserting a second type of gain media that is an isotopic variation of said first type of gain media.

* * * * *

UNITED STATES PATENT AND TRADEMARK OFFICE
CERTIFICATE OF CORRECTION

PATENT NO. : 5,172,387
DATED : December 15, 1992
INVENTOR(S) : DAVID FINK It is certified that error appears in the above-identified patent and that said Letters Patent is hereby corrected as shown below:

Column 1, line 20, delete "are" and substitute therefor --add--.

Column 1, line 26, delete "infraction" and substitute therefor "diffraction".

Column 2, line 53, after "invention" insert the words "forces a".

Column 4, line 18, delete "-possible" and substitute therefor --possible--.

Column 4, line 61, delete "$_{12}$" and substitute therefor "12".

Column 5, line 46, delete "medium" and substitute therefor "media".

Column 6, line 11, delete "medium" and substitute therefor "media".

UNITED STATES PATENT AND TRADEMARK OFFICE
CERTIFICATE OF CORRECTION

PATENT NO. : 5,172,387

DATED : December 15, 1992

INVENTOR(S) : David Fink

It is certified that error appears in the above-indentified patent and that said Letters Patent is hereby corrected as shown below:

Column 6, lines 48-49, 51, 58, 59, 61, 63, and 64, delete "media" and substitute therefor "medium".

Signed and Sealed this

Twenty-fourth Day of May, 1994

Attest:

BRUCE LEHMAN

Attesting Officer

Commissioner of Patents and Trademarks